(12) United States Patent
Lemmers, Jr. et al.

(10) Patent No.: US 8,084,902 B2
(45) Date of Patent: Dec. 27, 2011

(54) END PLATES FOR HIGH SPEED GENERATOR APPLICATIONS

(75) Inventors: Glenn C. Lemmers, Jr., Loves Park, IL (US); Scott R. Ganong, Stillman Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 183 days.

(21) Appl. No.: 12/436,177

(22) Filed: May 6, 2009

(65) Prior Publication Data

US 2010/0283352 A1 Nov. 11, 2010

(51) Int. Cl.
*H02K 9/19* (2006.01)
*H02K 9/193* (2006.01)

(52) U.S. Cl. ............. 310/52; 310/51; 310/61; 310/270; 310/400; 310/433

(58) Field of Classification Search ............... 310/52, 310/54, 270, 61, 400–433; 29/596, 598; *H02K 9/19, H02K 9/193*
See application file for complete search history.

(56) References Cited

U.S. PATENT DOCUMENTS

| | | | | |
|---|---|---|---|---|
| 3,694,906 A * | 10/1972 | Rank et al. | ........................ | 29/598 |
| 4,510,679 A * | 4/1985 | Aleem et al. | ..................... | 29/598 |
| 4,644,210 A * | 2/1987 | Meisner et al. | ............... | 310/211 |
| 5,300,848 A | 4/1994 | Huss et al. | | |
| 5,666,016 A * | 9/1997 | Cooper | .......................... | 310/270 |
| 6,465,928 B1 | 10/2002 | Shervington et al. | | |
| 6,727,634 B2 | 4/2004 | Tornquist et al. | | |
| 6,734,585 B2 | 5/2004 | Tornquist et al. | | |
| 6,791,230 B2 * | 9/2004 | Tornquist et al. | ............. | 310/214 |
| 6,849,987 B2 | 2/2005 | Tornquist et al. | | |
| 6,879,083 B2 | 4/2005 | Doherty et al. | | |
| 6,972,507 B1 * | 12/2005 | Kaminiski et al. | ............ | 310/270 |
| 7,146,707 B2 * | 12/2006 | Tornquist et al. | ............... | 29/598 |
| 7,199,338 B2 | 4/2007 | Breznak et al. | | |
| 7,262,537 B2 | 8/2007 | Worley et al. | | |
| 7,417,341 B2 | 8/2008 | Mall et al. | | |
| 7,486,053 B2 | 2/2009 | Qi et al. | | |
| 2002/0079752 A1 * | 6/2002 | Salamah et al. | ............ | 310/60 A |
| 2003/0048015 A1 * | 3/2003 | Tornquist et al. | ............. | 310/103 |
| 2003/0057801 A1 * | 3/2003 | Zeller et al. | .................... | 310/270 |
| 2005/0258708 A1 * | 11/2005 | Kaminiski et al. | ............ | 310/270 |

FOREIGN PATENT DOCUMENTS

JP 2006006091 * 1/2006

OTHER PUBLICATIONS

Machine translation of JP2006006091 Arai et al., Jan. 2006.*

* cited by examiner

*Primary Examiner* — Quyen Leung
*Assistant Examiner* — Terrance Kenerly
(74) *Attorney, Agent, or Firm* — Carlson, Gaskey & Olds, PC

(57) ABSTRACT

An end plate for a generator includes an end plate generally cylindrical and having a central bore to receive a rotor shaft. The end plate has a radially inner boss and a radially outer boss. The radially outer boss is positioned radially outwardly of windings in a generator. The radially inner boss is positioned radially inwardly of the windings in a generator. A main core assembly, a rotor, and a generator incorporating the end plates are all disclosed and claimed.

23 Claims, 4 Drawing Sheets

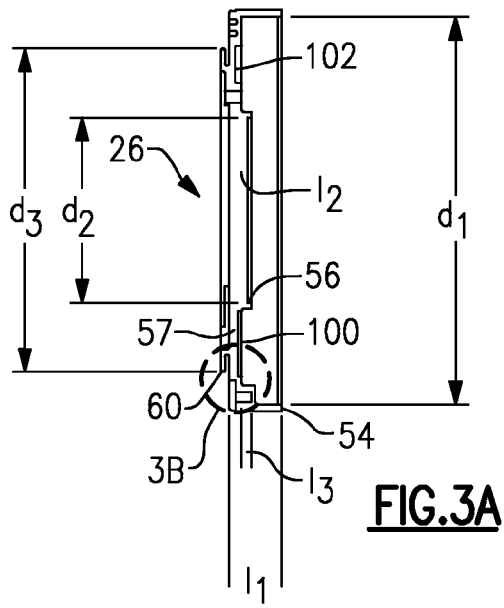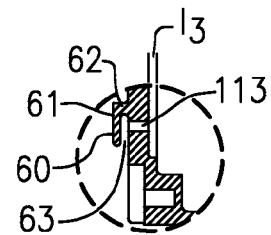
FIG.3A
FIG.3B
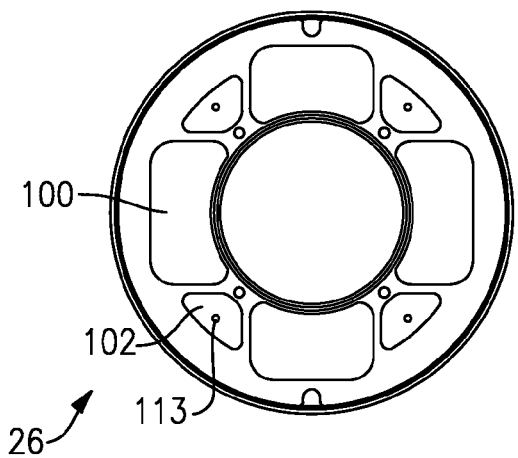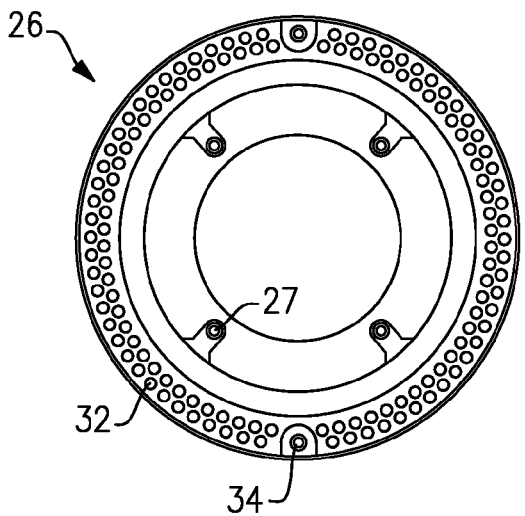
FIG.3C
FIG.3D

END PLATES FOR HIGH SPEED GENERATOR APPLICATIONS

BACKGROUND OF THE INVENTION

This application relates to end plates that provide support for the end turn windings in an electrical generator.

Electrical generators are known, and typically include a rotor shaft carrying a core and windings. The rotor shaft, core and windings are driven to rotate by a source of rotation. As an example, gas turbine engines are often utilized to drive the shaft of a generator. The core and windings rotate in proximity to stator coils and this relative rotation generates electrical current.

The generators operate at very high speeds of rotation, and there are various forces and challenges on the rotating components. As an example, the generator windings often require support. Further, the control and management of oil supply to the generator components has been challenging in the prior art.

SUMMARY OF THE INVENTION

An end plate for a generator includes an end plate generally cylindrical and having a central bore to receive a rotor shaft. The end plate has a radially inner boss and a radially outer boss. The radially outer boss is positioned radially outwardly of windings in a generator. The radially inner boss is positioned radially inwardly of the windings in a generator.

A rotor core for a generator includes a main core, and windings at each end of the main core. End plates are received on each axial side of the main core. The end plates are generally cylindrical and have a central bore to receive a rotor shaft. The end plates have a radially inner boss and a radially outer boss. The radially outer boss positioned radially outwardly of said windings, and said radially inner boss to be positioned radially inwardly of said windings.

A rotor assembly includes a rotor shaft, a main core, and windings at each end of the main core. End plates are received on each axial side of the main core. The end plates are generally cylindrical and have a central bore to receive a rotor shaft. The end plates have a radially inner boss and a radially outer boss. The radially outer boss is positioned radially outwardly of the windings. The radially inner boss is positioned radially inwardly of the windings. An axial length of the radially outer boss is greater than an axial length of the radially inner boss. A ratio of a length of the radially outer boss to a length of the radially inner boss is different for the two end plates.

A generator includes a stator and a rotor, the rotor including a rotor shaft, a main core, and windings at each end of the main core. End plates are received on each axial side of the main core. The end plates are generally cylindrical and have a central bore to receive a rotor shaft. The end plates have a radially inner boss and a radially outer boss. The radially outer boss is positioned radially outwardly of the windings. The radially inner boss is positioned radially inwardly of the windings. An axial length of said radially outer boss is greater than an axial length of the radially inner boss. A ratio of a length of the radially outer boss to a length of the radially inner boss is different for the two end plates.

These and other features of the present invention can be best understood from the following specification and drawings, the following of which is a brief description.

BRIEF DESCRIPTION OF THE DRAWINGS

FIG. 3A is a cross-sectional view of an end plate.
FIG. 3B is an enlarged portion of the area identified by the circle 3B in FIG. 3A.
FIG. 3C is an end view of the end plate from a first side.
FIG. 3D shows an opposed side of the end plate.

DETAILED DESCRIPTION OF THE PREFERRED EMBODIMENT

Figure 1A:
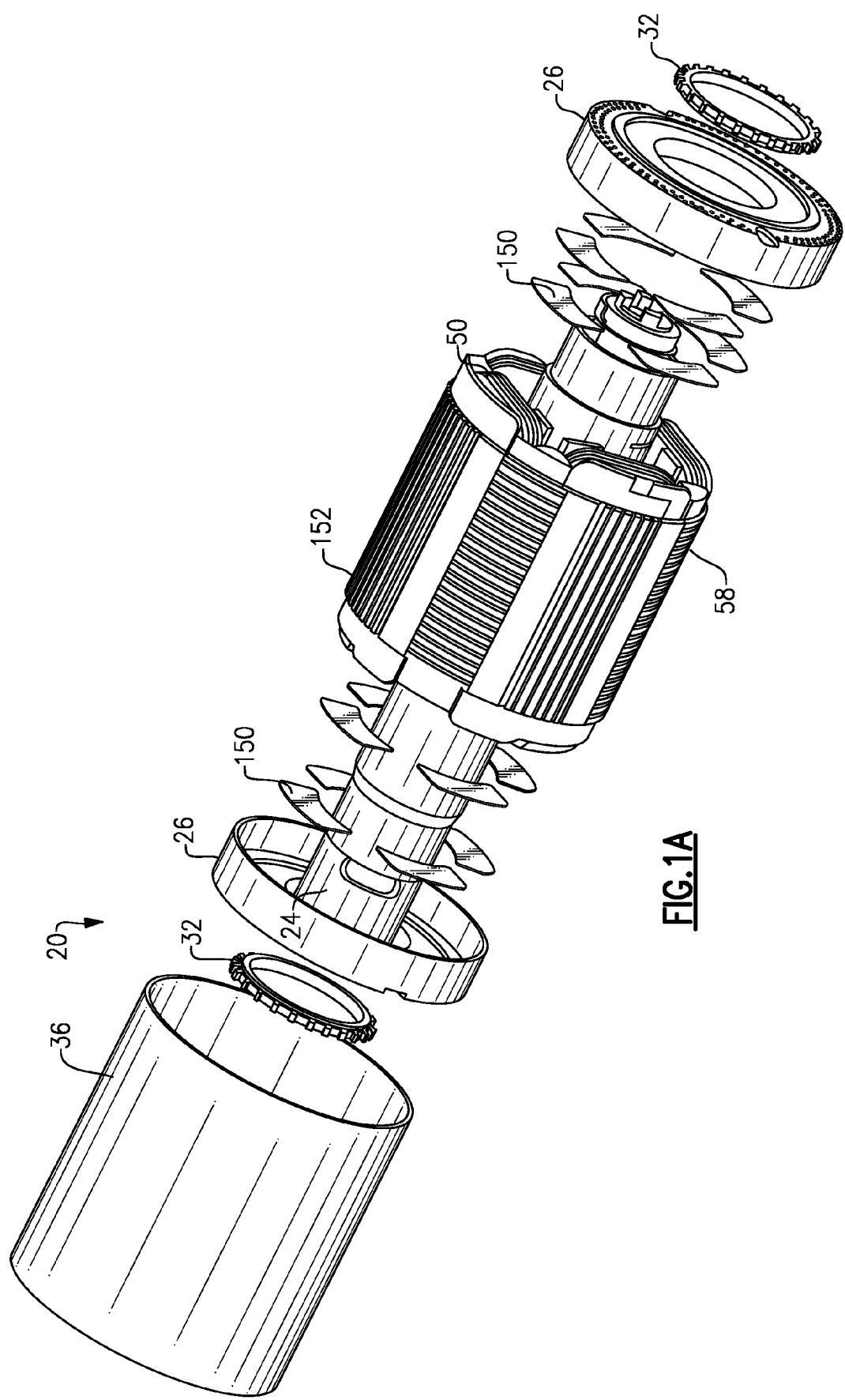
FIG. 1A is an exploded view of an inventive generator.

A generator 20 is illustrated in FIG. 1A. The generator 20 has a rotating core 152 associated with a shaft 24. Windings 50 are spaced about axial ends of the core 152. End plates 26 are secured to the rotor shaft 24 by spanner nuts 32. Spanner nuts 32 have internal threads that are received on threads on an outer periphery of the shaft 24. Insulating members 150 are positioned between the end plates 26 and the windings 50. The end plates 26 are cylindrical and may be formed of an appropriate metal such as steel and are desirably insulated from windings 50.

Figure 1B:
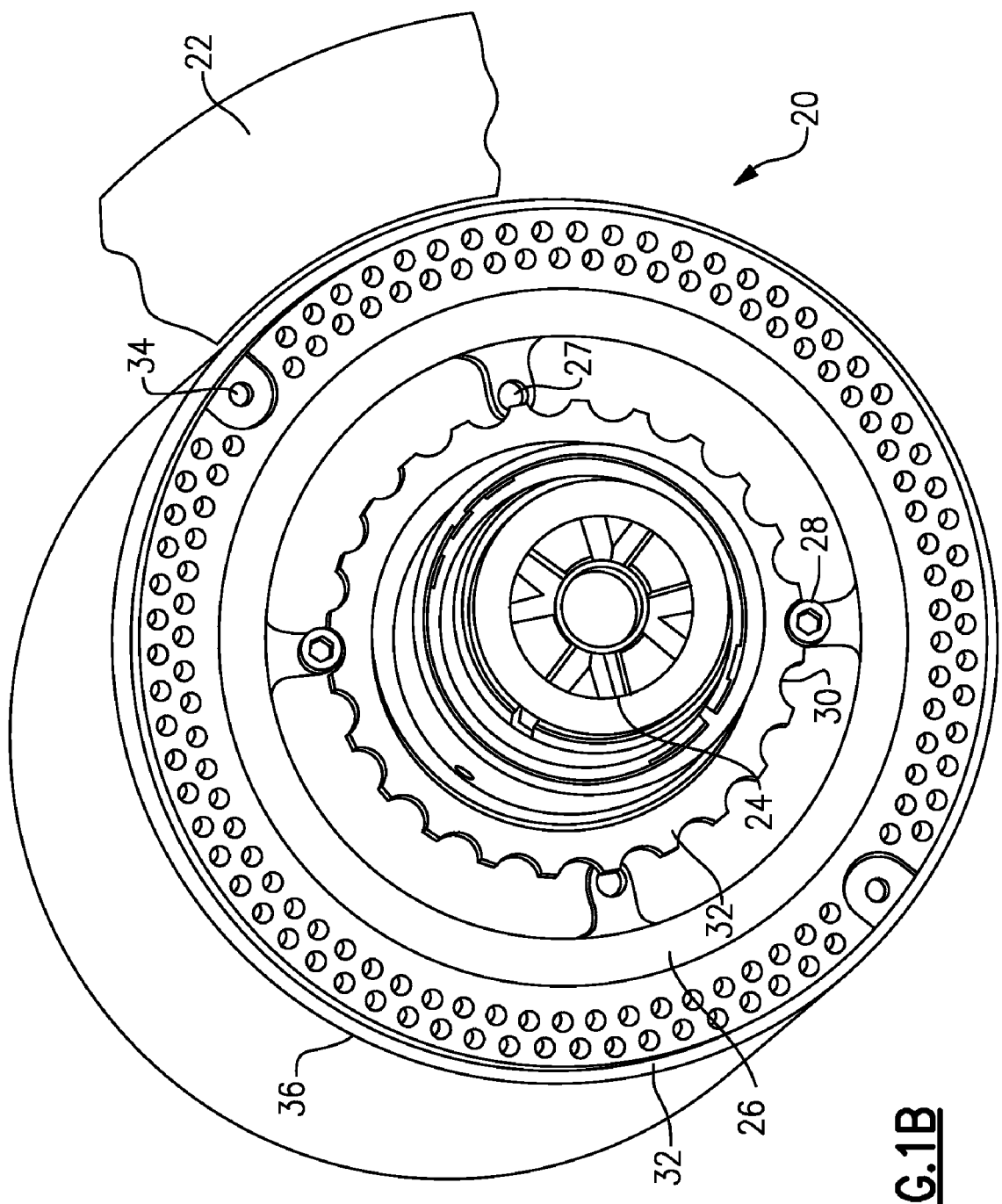
FIG. 1B shows an assembled end view.

As shown in FIG. 1B, a containment sleeve 36 surrounds the core 156, and the end plates 26. Details of this containment sleeve are disclosed in co-pending U.S. patent application Ser. No. 12/411,468 entitled "Generator Rotor With Improved Wedges" and filed on Mar. 26, 2009.

As shown in FIG. 1B, a plurality of notches 34 are formed in the end plate 26 and may be used to secure washers 40 (see FIG. 2) to hold the containment sleeve 36 on the rotor assembly. As shown schematically, a stator 22 is associated with the rotor assembly.

Inner holes 27 selectively receive screws 28 to lock the spanner nut once it has been tightened. The screws fit into notches 30 which are formed about the circumference of the spanner nut.

Figure 2:
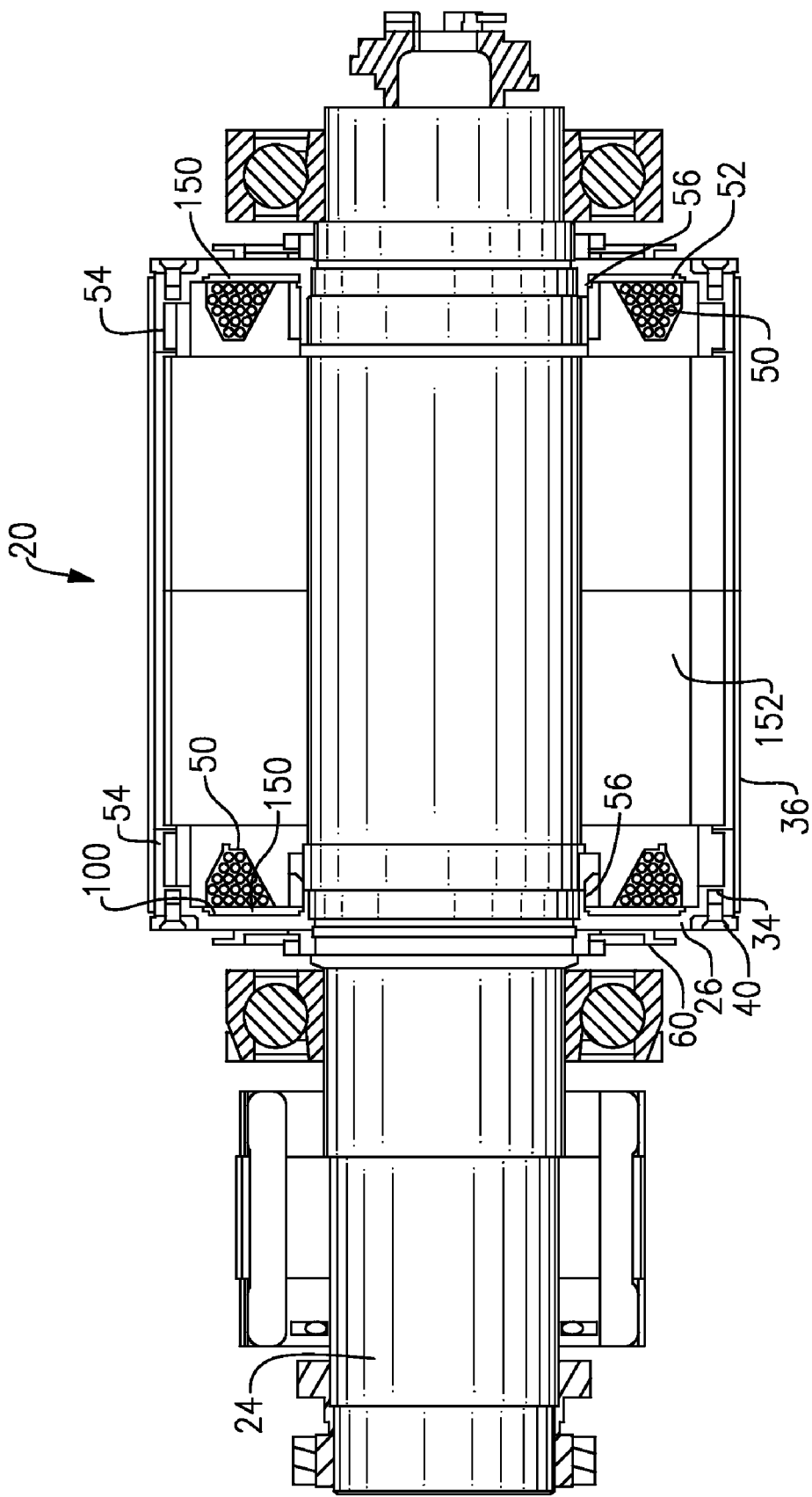
FIG. 2 is a cross-sectional view.

As shown in FIG. 2, the insulators 150 are positioned between the windings 50 and the inner face of the end plate 26. The washers 40 may be secured by the screws in notch 34 to hold the containment sleeve 36 on the overall assembly.

As further shown, an oil dam 60 is formed on the end plate 26 and serves to provide an area to control the flow of oil outwardly of the rotor, and to other components within the generator.

As shown in FIG. 3A, the end plates 26 incorporate pockets 102 and 100. The pockets 100 receive insulators 150 as shown above. The end plate has an outer boss 54 which will be received outwardly of the windings on the core assembly 152, and an inner boss 56 that extends inwardly of the windings, and defines a bore which allows passage of shaft 24. The location can be best seen in FIG. 2.

The inner boss 56 extends for a distance l2, whereas the outer boss 54 extends for a distance l1. The pockets 100 extend into the face for a depth of l3. The inner diameter of the outer boss is d1, and the inner diameter of the inner boss is d2.

A first diameter d1 is defined to a radially inner surface of the radially outer boss. A second diameter d2 is defined to an inner surface of the radially inner boss. In one embodiment, the diameter d1 was 5.075" (128.905 mm), and the diameter d2 was 2.427" (61.646 mm). The length l1 was 0.820" (20.828 mm), the length l2 was 0.345" (8.763 mm), and the length l3 was 0.06" (1.524 mm). A ratio of d1 to d2 is between 2.0 and 2.2. A ratio of l1 to l2 is between 2.30 and 2.55, and a ratio of l1 to l3 is between 12 and 17.

FIG. 3A shows one of the two end plates. Due to winding "bend back," the length of the l1 and l2 dimensions between the two end plates on any one generator will differ. One of the two is discussed above and illustrated in FIG. 3B. In an embodiment, the other end plate would have the dimension l1 of 9.899" (22.835 mm), and l2 of 0.364" (9.246 mm). The ratio for this end plate would be between 2.30 and 2.55.

FIG. 3B is a detail of the dam 60, and shows the dam 60 including an axially extending flange 62 extending from a forward face 63 of the end plate 26, and then a radial outwardly extending ledge 61. This creates a pocket that receives oil which may flow from a plurality of holes 113 which are formed from the interior of the rotor. The diameter to the outer boss 54 is d1, and the diameter to the radially outer edge of the dam 60 is d3. In one embodiment, the diameter d3 was 3.950" (100.33 mm). A ratio of d1 to d3 is between 1.20 and 1.35.

As shown in FIG. 3C, there are pockets 100 and 102. The pockets 102 receive the holes 113.

As shown in FIG. 3D, the end plate 26 is formed with the screw threads 27, the bolt holes 34, and the plurality of holes 32, which may receive balance weights.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An end plate for a generator comprising:
   an end plate being generally cylindrical and having a central bore to receive a rotor shaft;
   said end plate having a radially inner boss and a radially outer boss, said radially outer boss positioned radially outwardly of windings in a generator, and said radially inner boss positioned radially inwardly of the windings in a generator; and
   an axial length of said radially outer boss being greater than an axial length of said radially inner boss, and a first diameter being defined to a radially inner surface of said radially outer boss, and a second diameter being defined to an inner surface of said radially inner boss, and a ratio of said first diameter to said second diameter being between 2.0 and 2.2.

2. The end plate as set forth in claim 1, wherein a ratio of a length of said radially outer boss to a length of said radially inner boss is between 2.30 and 2.55.

3. The end plate as set forth in claim 1, wherein pockets are formed at circumferentially spaced locations on an inner face of said end plate, said pockets being formed into the inner face of said end plate by a pocket distance, and said radially outer boss extending from said inner face by a second distance, a ratio of said pocket distance to said second distance being between 12 and 17.

4. The end plate as set forth in claim 3, wherein insulators are received within said pocket to insulate between said end plate and said windings.

5. The end plate as set forth in claim 1, wherein an oil dam is formed extending away from an outer face of said end plate, said oil dam including a first flange extending along an axial centerline away from said outer face and to a radially outwardly extending flange which, in combination with said first flange, provides an oil recess on said outer face.

6. The end plate as set forth in claim 5, wherein holes extend through said end plate to supply oil to the recess.

7. The end plate as set forth in claim 5, wherein an oil dam outer diameter can be defined from a centerline of said end plate to an outer peripheral surface on said oil dam, and an outer boss outer diameter can be defined to an outer peripheral surface of said outer boss, a ratio of said outer boss diameter to said oil dam diameter being between 1.20 and 1.35.

8. A rotor core for a generator comprising:
   a main core, and windings at each end of said main core;
   end plates received on each axial side of said main core, said end plates being generally cylindrical and having a central bore to receive a rotor shaft;
   said end plates having a radially inner boss and a radially outer boss, said radially outer boss positioned radially outwardly of said windings, and said radially inner boss positioned radially inwardly of said windings; and
   an axial length of said radially outer boss is greater than an axial length of said radially inner boss, and a ratio of a length of said radially outer boss to a length of said radially inner boss differs between said two end plates.

9. The rotor core for a generator as set forth in claim 8, wherein an axial length of said radially outer boss being greater than an axial length of said radially inner boss, and a first diameter being defined to a radially inner surface of said radially outer boss, and a second diameter being defined to an inner surface of said radially inner boss, and a ratio of said first diameter to said second diameter being between 2.0 and 2.2.

10. A rotor core for a generator comprising:
    a main core, and windings at each end of said main core;
    end plates received on each axial side of said main core, said end plates being generally cylindrical and having a central bore to receive a rotor shaft;
    said end plates having a radially inner boss and a radially outer boss, said radially outer boss positioned radially outwardly of said windings, and said radially inner boss positioned radially inwardly of said windings; and
    pockets are formed at circumferentially spaced locations on an inner face of said end plate, said pockets being formed into the inner face of said end plate by a pocket distance, and said outer boss extending from said inner face by a second distance, a ratio of said pocket distance to said second distance being between 12 and 17, and insulators received within said pocket to insulate between said end plate and said windings.

11. A rotor core for a generator comprising:
    a main core, and windings at each end of said main core;
    end plates received on each axial side of said main core, said end plates being generally cylindrical and having a central bore to receive a rotor shaft;
    said end plates having a radially inner boss and a radially outer boss, said radially outer boss positioned radially outwardly of said windings, and said radially inner boss positioned radially inwardly of said windings; and
    an oil dam being formed extending away from an outer face of said end plates, said oil dam including a first flange extending along an axial centerline away from said outer face and to a radially outwardly extending flange which, in combination with said first flange, provides an oil recess on said outer surface with holes extending through said end plate to supply oil to the recess.

12. A rotor core for a generator comprising:
    a main core, and windings at each end of said main core;
    end plates received on each axial side of said main core, said end plates being generally cylindrical and having a central bore to receive a rotor shaft;
    said end plates having a radially inner boss and a radially outer boss, said radially outer boss positioned radially outwardly of said windings, and said radially inner boss positioned radially inwardly of said windings; and
    spanner nuts are associated with said core, and have internal threads to be received on a shaft when said rotor core is associated with a shaft.

13. A rotor assembly comprising:
    a rotor shaft, a main core, and windings at each end of said main core; and end plates received on each axial side of said main core, said end plates being generally cylindrical and having a central bore to receive a rotor shaft;

said end plates having a radially inner boss and a radially outer boss, said radially outer boss positioned radially outwardly of said windings, and said radially inner boss positioned radially inwardly of said windings;

an axial length of said radially outer boss is greater than an axial length of said radially inner boss, and a ratio of a length of said radially outer boss to a length of said radially inner boss is different for the two end plates.

14. The rotor assembly as set forth in claim 13, wherein pockets are formed at circumferentially spaced locations on an inner face of said end plate, said pockets being formed into the inner face of said end plate by a pocket distance, and said outer boss extending from said inner face by a second distance, a ratio of said pocket distance to said second distance being between 12 and 17, and insulators being received within said pocket to insulate between said end plate and said winding.

15. The rotor assembly as set forth in claim 13, wherein an oil dam is formed extending away from an outer face of said end plates, said oil dam including a first flange extending along an axial centerline away from said outer face and to a radially outwardly extending flange which, in combination with said first flange, provides an oil recess on said outer surface, and holes extending through said end plate to supply oil to the recess.

16. The rotor assembly as set forth in claim 15, wherein spanner nuts have internal threads received on said shaft to secure said end plates.

17. The rotor assembly as set forth in claim 13, wherein an axial length of said radially outer boss being greater than an axial length of said radially inner boss, and a first diameter being defined to a radially inner surface of said radially outer boss, and a second diameter being defined to an inner surface of said radially inner boss, and a ratio of said first diameter to said second diameter being between 2.0 and 2.2.

18. A generator comprising:
a stator;
a rotor, said rotor comprising a rotor shaft, a main core, and windings at each end of said main core; and
end plates received on each axial side of said main core, said end plates being generally cylindrical and having a central bore to receive a rotor shaft;
said end plates having a radially inner boss and a radially outer boss, said radially outer boss positioned radially outwardly of said windings, and said radially inner boss positioned radially inwardly of said windings;
an axial length of said radially outer boss is greater than an axial length of said radially inner boss, and a ratio of a length of said radially outer boss to a length of said radially inner boss is different for the two end plates.

19. The generator as set forth in claim 18, wherein pockets are formed at circumferentially spaced locations on an inner face of said end plate, said pockets being formed into the inner face of said end plate by a pocket distance, and said outer boss extending from said inner face by a second distance, a ratio of said pocket distance to said second distance being between 12 and 17, and insulators being received within said pocket to insulate between said end plate and said winding.

20. The generator as set forth in claim 18, wherein an oil dam is formed extending away from an outer face of said end plates, said oil dam including a first flange extending along an axial centerline away from said outer face and to a radially outwardly extending flange which, in combination with said first flange, provides an oil recess on said outer surface, and holes extending through said end plate to supply oil to the recess.

21. The generator as set forth in claim 20, wherein spanner nuts have internal threads received on said shaft to secure said end plates.

22. The generator as set forth in claim 18, wherein an axial length of said radially outer boss being greater than an axial length of said radially inner boss, and a first diameter being defined to a radially inner surface of said radially outer boss, and a second diameter being defined to an inner surface of said radially inner boss, and a ratio of said first diameter to said second diameter being between 2.0 and 2.2.

23. A method of assembling a generator comprising the steps of:
providing a main core with windings at each end of said main core, and moving an end plate into each axial side of said main core, said end plates being generally cylindrical and having a central bore to receive a rotor shaft, and said end plates having a radially inner boss moved inwardly of said windings, and a radially outer boss moved outwardly of said windings, and an axial length of said radially outer boss being greater than an axial length of said radially inner boss, and a ratio of a length of said radially outer boss to a length of said radially inner boss being different for the two end plates.

* * * * *